United States Patent
Serizawa et al.

(10) Patent No.: US 12,172,701 B2
(45) Date of Patent: Dec. 24, 2024

(54) DETECTOR ATTACHMENT STRUCTURE FOR VEHICLE

(71) Applicant: ISUZU MOTORS LIMITED, Tokyo (JP)

(72) Inventors: Takayoshi Serizawa, Fujisawa (JP); Gilwha Jin, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 17/802,714

(22) PCT Filed: Feb. 24, 2021

(86) PCT No.: PCT/JP2021/006948
§ 371 (c)(1),
(2) Date: Aug. 26, 2022

(87) PCT Pub. No.: WO2021/172386
PCT Pub. Date: Sep. 2, 2021

(65) Prior Publication Data
US 2023/0138778 A1 May 4, 2023

(30) Foreign Application Priority Data
Feb. 28, 2020 (JP) .................................. 2020-033771

(51) Int. Cl.
*B62D 25/18* (2006.01)
*B62D 25/16* (2006.01)

(52) U.S. Cl.
CPC .......... *B62D 25/18* (2013.01); *B62D 25/163* (2013.01)

(58) Field of Classification Search
CPC .... B62D 25/18; B62D 25/163; B62D 25/168; B62D 25/166; B60D 1/58; B60R 11/04;
(Continued)

(56) References Cited

U.S. PATENT DOCUMENTS 9,132,791 B2 * 9/2015 Yamasaki ........... B60R 16/0239
9,399,490 B2 * 7/2016 Aitharaju ................ B29C 70/72
(Continued)

FOREIGN PATENT DOCUMENTS

CN  102642565 A  8/2012
CN  203439141 U  2/2014
(Continued)

OTHER PUBLICATIONS

Patent Cooperation Treaty, International Search Report, Application No. PCT/JP2021/006948, dated May 18, 2021, in 5 pages.
(Continued)

*Primary Examiner* — Steve Clemmons
(74) *Attorney, Agent, or Firm* — PROCOPIO, CORY, HARGREAVES & SAVITCH LLP

(57) ABSTRACT

Resin plate-shaped mudguards 11 are disposed on vehicle width direction outer sides of left and right side members 7 below a cab. A cab rear member 12 is fixed to a vehicle body frame 5 and extends upward from the vehicle body frame 5 to support a rear end side of the cab from below. Mudguard brackets 17 for supporting the left and right mudguards 11 are fixed to an upper end portion of a support member 15L of the cab rear member 12. The mudguard 11 is disposed forward of the mudguard bracket 17 and supported by the mudguard bracket 17. A BSM radar 10 detects information of an object around a vehicle, is disposed on a vehicle width direction outer end portion behind the mudguard 11, and is fixed to a second bracket 19 of the mudguard bracket 17 via a radar bracket 20.

10 Claims, 8 Drawing Sheets

(58) Field of Classification Search
CPC ......... B60R 2300/802; B60R 2011/004; G01S 13/60; G01S 2015/937; G01S 15/931

See application file for complete search history.

(56) References Cited

U.S. PATENT DOCUMENTS

| | | | |
|---|---|---|---|
| 10,035,482 B2 * | 7/2018 | Sugie | ................. G01S 7/521 |
| 11,260,920 B2 * | 3/2022 | Bender | ............... B62D 25/188 |
| 11,447,199 B2 * | 9/2022 | Shen | ................. G01S 13/931 |
| 11,624,720 B2 * | 4/2023 | Boenke | ............... B62D 25/166 |
| | | | 324/439 |
| 2010/0025978 A1 | 2/2010 | Tomizawa et al. | |
| 2021/0309161 A1 * | 10/2021 | Maeda | ................. B60D 1/58 |

FOREIGN PATENT DOCUMENTS

| | | | | |
|---|---|---|---|---|
| CN | 205017881 U | | 2/2016 | |
| CN | 207466799 U | | 6/2018 | |
| CN | 208630712 U | * | 3/2019 | |
| DE | 102016118347 A1 | * | 3/2017 | ............. B60R 11/00 |
| JP | UM-S57-122453 A | | 1/1956 | |
| JP | 2006-015789 A | | 1/2006 | |
| JP | 2007-261349 A | | 10/2007 | |
| JP | 2013-107516 A | | 6/2013 | |
| JP | 2014-221641 A | | 11/2014 | |
| JP | 2015-020607 A | | 2/2015 | |
| JP | 2016-164011 A | | 9/2016 | |
| JP | 2017-039418 A | | 2/2017 | |
| JP | 2017-065592 A | | 4/2017 | |
| JP | 2018-047768 A | | 3/2018 | |
| JP | 2018-135062 A | | 8/2018 | |
| WO | 2008-066047 A1 | | 6/2008 | |
| WO | 2011-070388 A1 | | 6/2011 | |

OTHER PUBLICATIONS

Patent Cooperation Treaty, WOSA, Application No. PCT/JP2021/006948, dated May 18, 2021, in 3 pages.

National Intellectual Property Administration, Notification of the First Office Action, Application No. 202180017248.7, dated Apr. 28, 2023, in 21 pages.

Japanese Patent Office, Decision on Oppoisition, Application No. 2020-033771, dated Apr. 3, 2024, in 32 pages.

Takuya Shoda, "[Tokyo Motor Show 2019] Isuzu, [a hybridconnection bus "*** duo, a new model "G", etc ] The exhibition, [online], Oct. 24, 2019, Car Watch, Internet <URL:https://car,watch.impress.co.jp/docs/event_repo/tokyo2019/1214290.html>, in 6 pages.

Carview!, "Tokyo Motor Show 2019", [online], Oct. 15, 2019, carview!, <URL:https://carview.yahoo.co.jp/motorshow/tokoy-motorshow/car/12/11801/10/>; referenced in JP Decision on Oppo-sition, concise explaination of the non-patent document.

* cited by examiner

DETECTOR ATTACHMENT STRUCTURE FOR VEHICLE

CROSS-REFERENCE TO RELATED APPLICATIONS

This application is US National Stage of International Patent Application PCT/JP2021/006948, filed Feb. 24, 2021, which claims benefit of priority from Japanese Patent Application 2020-033771, filed Feb. 28, 2020, the contents of both of which are incorporated herein by reference.

TECHNICAL FIELD

The present disclosure relates to a detector attachment structure for a vehicle.

BACKGROUND ART

Patent Literature 1 discloses a mudguard for a vehicle. A resin fender is disposed above a rear portion of a wheel (front wheel). The fender is fixed to a vehicle body frame. A rubber mudguard is fixed to a lower end of the fender. On a rear surface of the mudguard, a roll-up prevention member for preventing the mudguard from rolling up is disposed. The roll-up prevention member is fixed to a relay box support bracket. At a position near the rear of the mudguard and above the roll-up prevention member, a relay box is disposed. In addition, behind the relay box, a battery bracket that supports a battery on a vehicle body frame side is disposed. Below the battery bracket, a reservoir tank is disposed. The reservoir tank is supported on the vehicle body frame by a bracket.

CITATION LIST

Patent Literature

Patent Literature 1: JP2006-15789A

SUMMARY OF THE INVENTION

Technical Problem

In a vehicle including a detector such as a blind spot monitoring (BSM) radar on a vehicle width direction outer end portion of a vehicle, such as a vehicle equipped with a BSM system that detects a vehicle or a person present in a blind spot of the vehicle, a bracket extends from a vehicle body frame to a vehicle width direction outer side, and the detector is attached to a tip end side of the bracket. In a vehicle including a fender (mudguard) on the vehicle width direction outer side of the vehicle body frame, such as the vehicle described in Patent Literature 1, the detector may be desired to be disposed behind the mudguard. In this case, when the detector is disposed near the rear of the mudguard, the mudguard may interfere with the detector while the mudguard vibrates due to vibration of the vehicle, and the detector may be damaged. In order to avoid interference between the mudguard and the detector, it is conceivable to dispose the detector rearward away from the rear of the mudguard. In a vehicle in which various devices (for example, a relay box, a reservoir tank, and various brackets) are disposed behind the mudguard, such as the vehicle described in Patent Literature 1, it is difficult to dispose the detector away from the rear of the mudguard.

An object of the present disclosure is to provide a detector attachment structure for a vehicle, which enables to prevent damage of a detector due to interference with a mudguard.

Solution to Problem

A detector attachment structure for a vehicle according to a first aspect of the present disclosure includes a mudguard bracket, a mudguard, and a detector. The mudguard bracket is disposed on a vehicle width direction outer side of a vehicle body frame and is fixed to the vehicle body frame. The mudguard is disposed forward of the mudguard bracket and supported by the mudguard bracket. The detector is disposed on a vehicle width direction outer end portion behind the mudguard and is fixed to the mudguard bracket to detect external information of the vehicle.

In the above configuration, since the detector is fixed to the mudguard bracket that supports the mudguard, when the mudguard vibrates due to vibration of the vehicle, the mudguard bracket and the detector also vibrate integrally. In this way, when the mudguard vibrates, the detector also vibrates integrally. Therefore, the interference between the mudguard and the detector can be prevented, and the detector can be prevented from being damaged due to the interference with the mudguard even when the detector is disposed near the rear of the mudguard.

A second aspect of the present disclosure relates to the detector attachment structure for the vehicle according to the first aspect, which further includes a cab and a cab rear member. The cab is disposed above the vehicle body frame. The cab rear member is fixed to the vehicle body frame and extends upward from the vehicle body frame to support a rear end side of the cab from below. The mudguard bracket includes an upper bracket portion disposed above the vehicle body frame and extending from the cab rear member to the vehicle width direction outer side, and a vertical bracket portion extending downward from the upper bracket portion, disposed behind the mudguard, and fixed to the mudguard, and the mudguard bracket is fixed to the vehicle body frame via the cab rear member. The detector is fixed to the vertical bracket portion of the mudguard bracket.

In the above configuration, the mudguard bracket is fixed to the vehicle body frame via the cab rear member. That is, since the detector is attached to the vehicle body frame via the mudguard bracket and the cab rear member, in a vehicle equipped with a cab rear member, the cab rear member can be used to attach the detector to the vehicle body frame.

A third aspect of the present disclosure relates to the detector attachment structure for the vehicle according to the second aspect, in which the mudguard bracket includes a lower bracket portion extending from a lower end side of the vertical bracket portion to a vehicle width direction inner side and fixed to the vehicle body frame.

In the above configuration, the mudguard bracket includes the lower bracket portion extending from the lower end side of the vertical bracket portion to the vehicle width direction inner side and fixed to the vehicle body frame. That is, in the vertical bracket portion of the mudguard bracket that supports the detector, an upper side thereof is supported on a vehicle body frame side via the upper bracket portion and a lower side thereof is supported on the vehicle body frame side via the lower bracket portion. In this way, the upper and lower ends of the vertical bracket portion of the mudguard bracket are supported on the vehicle body frame side. Therefore, vibration of the vertical bracket portion of the mudguard bracket can be prevented and vibration of the detector can be prevented when the vehicle vibrates.

A fourth aspect of the present disclosure relates to the detector attachment structure for the vehicle according to the first aspect, which further includes a detector bracket fixed to the mudguard bracket. The mudguard bracket includes a frame fixing portion extending in an up-down direction and fixed to the vehicle body frame, an upper mudguard fixing portion extending from an upper end side of the frame fixing portion to the vehicle width direction outer side and fixed to the mudguard, and a lower mudguard fixing portion extending from a lower end side of the frame fixing portion to the vehicle width direction outer side and fixed to the mudguard, and the mudguard bracket is formed in a substantially U shape. The detector bracket is disposed on the vehicle width direction outer side with respect to the frame fixing portion of the mudguard bracket and between the upper mudguard fixing portion and the lower mudguard fixing portion, and extends in the up-down direction, and upper and lower end portions of the detector bracket are fixed to the upper mudguard fixing portion and the lower mudguard fixing portion. The detector is fixed to the mudguard bracket via the detector bracket by being fixed to the detector bracket.

In the above configuration, the detector bracket is disposed on the vehicle width direction outer side with respect to the frame fixing portion of the mudguard bracket and between the upper mudguard fixing portion and the lower mudguard fixing portion, and extends in the up-down direction, and the upper and lower end portions thereof are fixed to the upper mudguard fixing portion and the lower mudguard fixing portion. Therefore, even when the mudguard bracket is formed in a substantially U shape, the detector can be fixed to the mudguard bracket via the detector bracket.

In addition, since the upper and lower end portions of the detector bracket are fixed to the upper mudguard fixing portion and the lower mudguard fixing portion of the mudguard bracket, the vibration of the detector bracket can be prevented and the vibration of the detector can be prevented when the vehicle vibrates.

Advantageous Effects of Invention

According to the detector attachment structure of the present disclosure, damage to the detector due to interference with the mudguard can be prevented.

DESCRIPTION OF EMBODIMENTS

Figure 1:
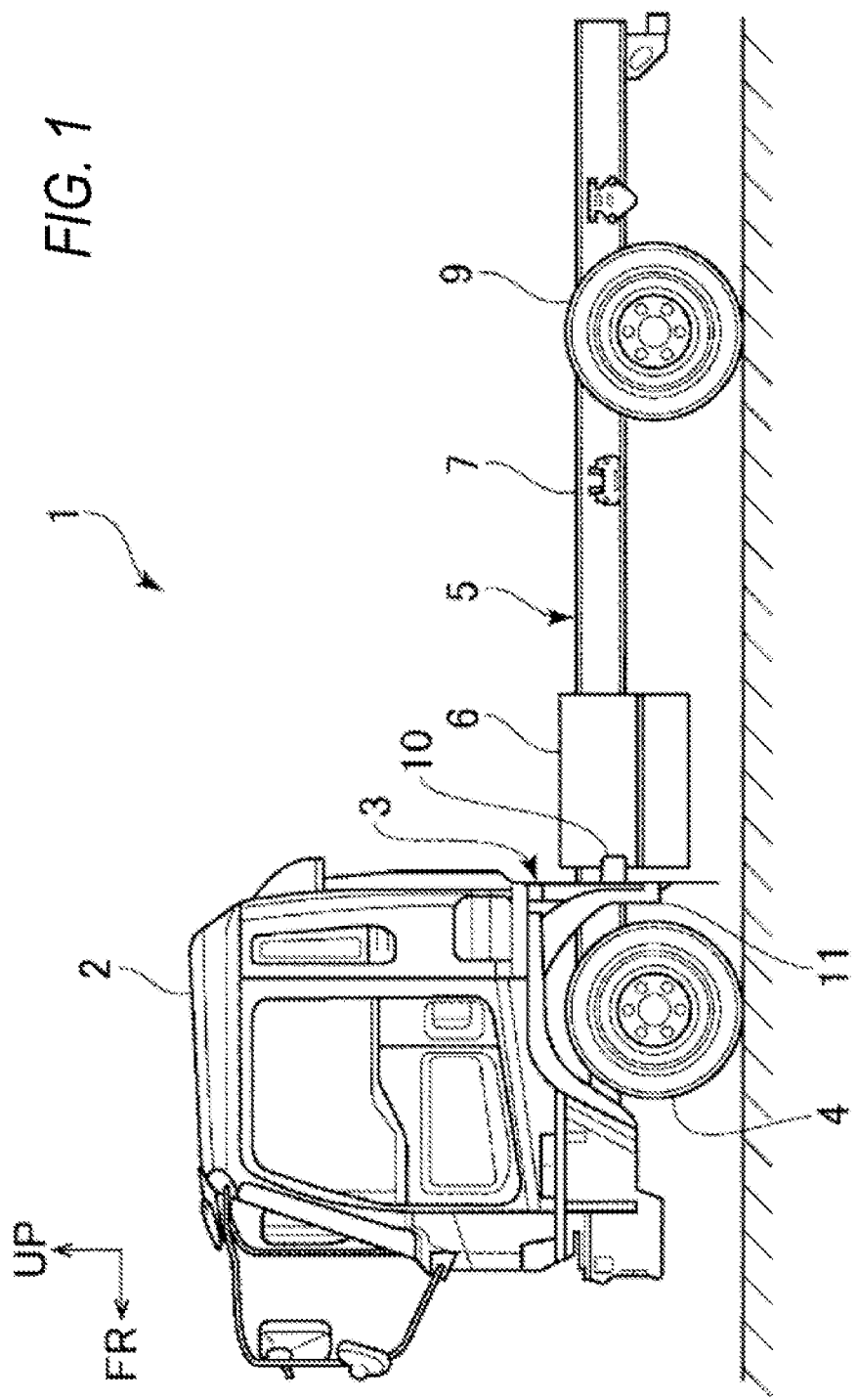
FIG. 1 is a side view of a vehicle to which a detector attachment structure according to a first embodiment of the present disclosure is applied.
Figure 2:
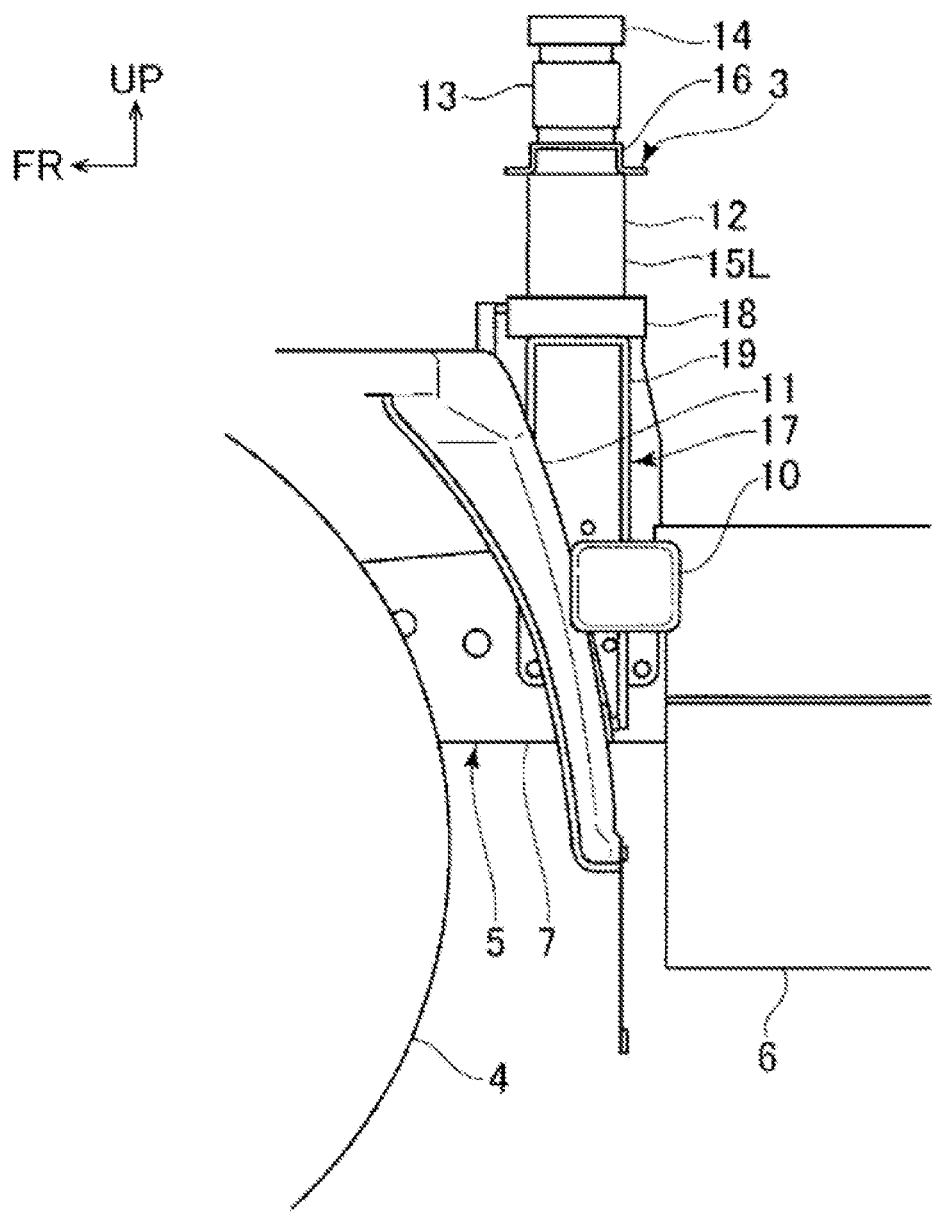
FIG. 2 is an enlarged view of a main part in FIG. 1.
Figure 3:
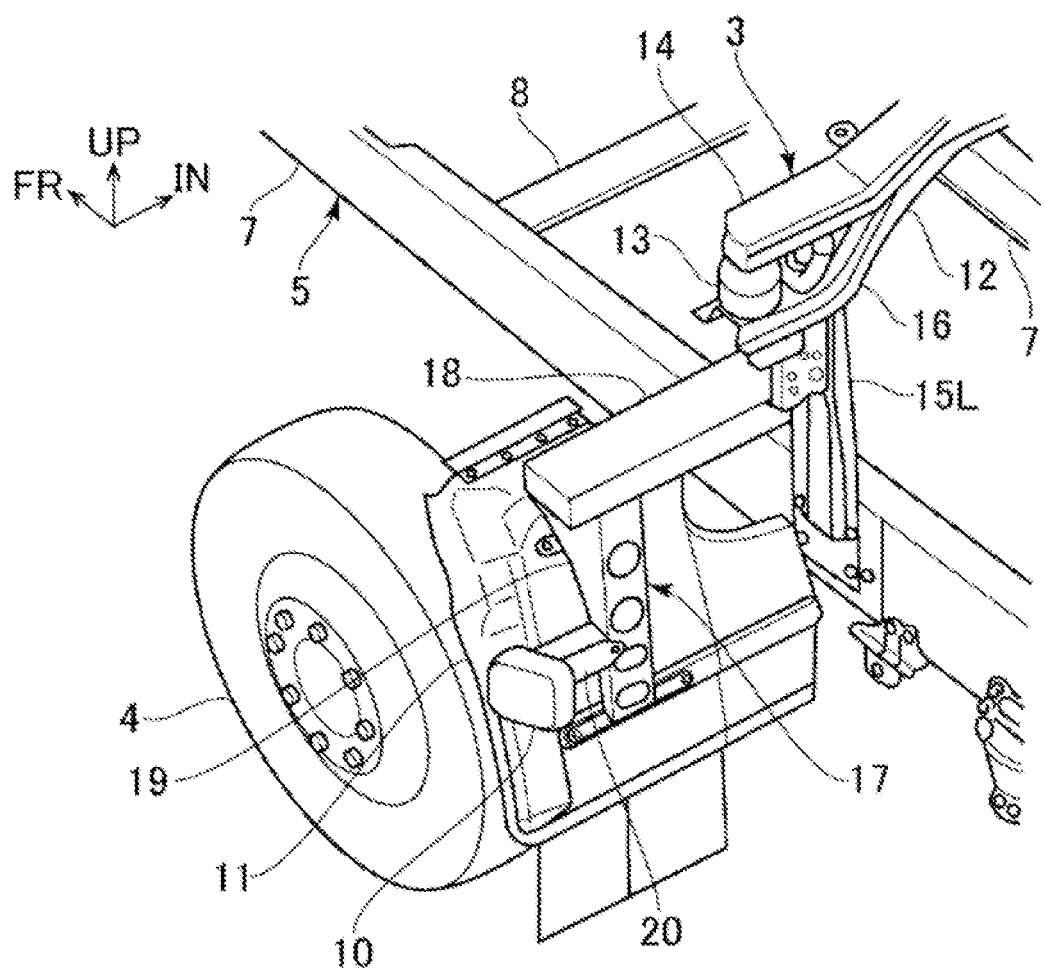
FIG. 3 is a perspective view of FIG. 2 when viewed from a rear upper side.

Hereinafter, a first embodiment of the present disclosure will be described with reference to the drawings. In the drawings, FR indicates a front side of a vehicle, UP indicates an upper side of the vehicle, and IN indicates a vehicle width direction inner side. In addition, in the following description, a front-rear direction refers to a front-rear direction of the vehicle, and a left-right direction refers to a left-right direction in a state of facing the front side of the vehicle.

As shown in FIG. 1, a detector attachment structure for a vehicle according to the present embodiment is applied to an attachment structure of a blind spot monitoring (BSM) radar 10 in a vehicle 1 provided with a BSM system that detects external information on other vehicles around the own vehicle by a plurality of BSM radars (detectors) 10. Since the detector attachment structure for a vehicle according to the present embodiment is applied to the attachment structure of a predetermined BSM radar 10 (BSM radar 10 behind a mudguard 11 described later) among a plurality of BSM radars 10, in FIG. 1, only the predetermined BSM radar 10 is shown, and other BSM radars 10 are not shown.

A cab 2 of the vehicle 1 is disposed above the front of a vehicle body frame 5, and is supported from below by the vehicle body frame 5 via a front cab mount (not shown), and a rear end side thereof is supported from below by the vehicle body frame 5 via a rear cab mount 3.

Figure 4:
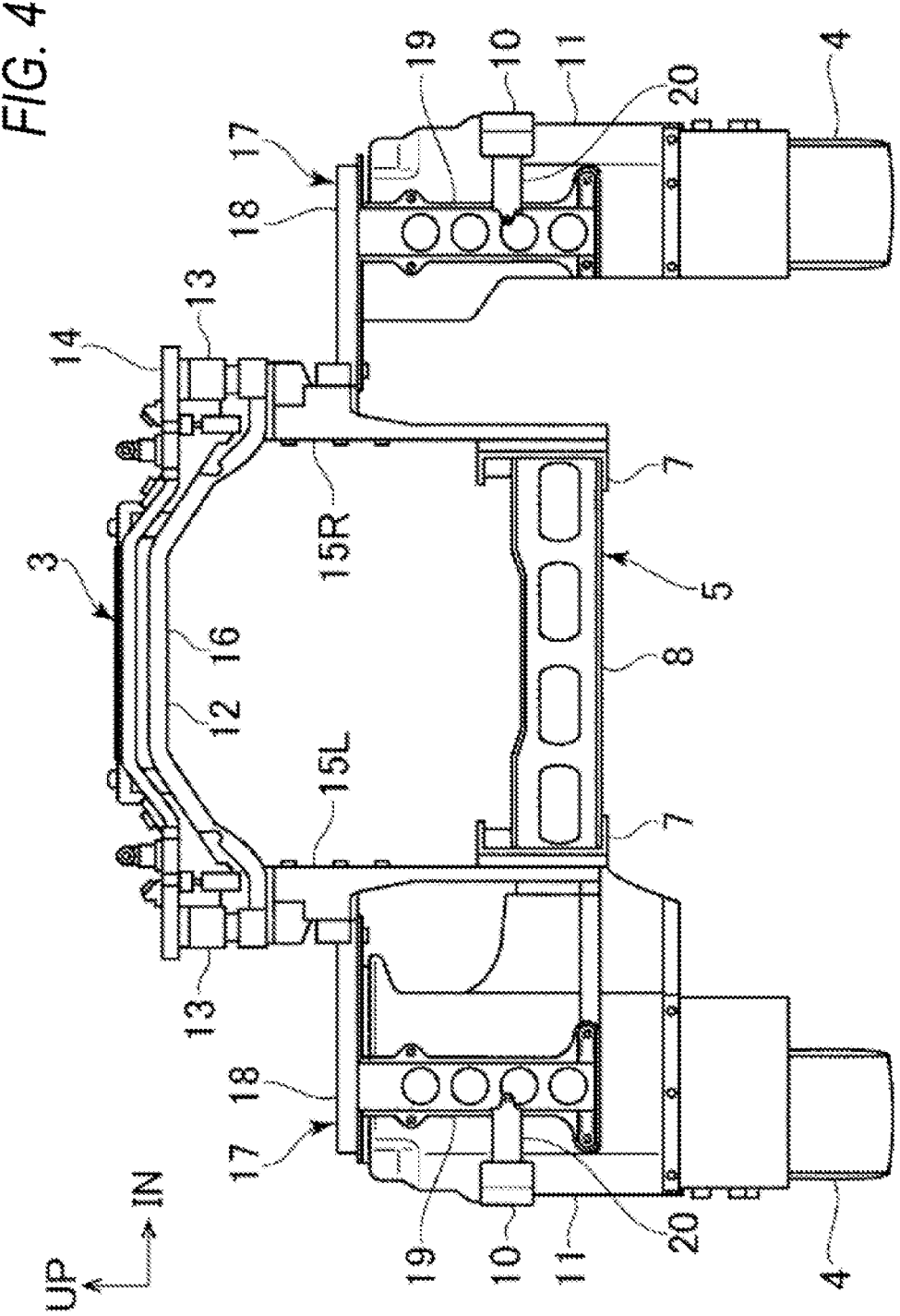
FIG. 4 is a rear view of FIG. 2.

As shown in FIG. 1 to FIG. 4, the vehicle body frame 5 includes a pair of, i.e., left and right side members 7 extending along the front-rear direction on both sides of the vehicle 1 in a vehicle width direction, and a plurality of cross members 8 extending in the vehicle width direction and connecting the left and right side members 7 to each other (FIG. 4 shows only one cross member 8).

Left and right front wheels 4 are disposed on vehicle width direction outer sides of the left and right side members 7 below the cab 2, and resin plate-shaped left and right mudguards 11 are disposed behind the left and right front wheels 4. A battery box 6 is disposed on the vehicle width direction outer side of the side member 7 (in the present embodiment, the left side member 7) behind the cab 2. The battery box 6 is disposed behind the mudguards 11. Predetermined BSM radars 10 (hereinafter, simply referred to as "BSM radars 10") are disposed on vehicle width direction outer end portions behind the left and right mudguards 11 and are attached to the vehicle body frame 5. Since the attachment structures of the left and right BSM radars 10 have substantially the same configurations on the left and right sides of the vehicle 1, the left side will be described below, and the detailed description on the right side will be omitted.

The rear cab mount 3 that supports the rear end side of the cab 2 includes an arch-shaped cab rear member 12 fixed to the left and right side members 7, and a floating member 14 extending above the cab rear member 12 in the vehicle width direction and elastically supported by the cab rear member 12 via the left and right air suspensions 13, and is disposed near the rear of the cab 2. The floating member 14 supports a lower portion of a rear end of the cab 2 from below.

The cab rear member 12 includes a pair of, i.e., left and right support members 15L and 15R whose lower end portions are fixed to the left and right side members 7 and stand up approximately along a vertical direction, and a cab mount bracket 16 extending in the vehicle width direction and connecting upper end portions of the left and right support members 15L and 15R, and is formed in an arch shape. The upper end portions of the left and right support members 15L and 15R are disposed above the vehicle body frame 5. That is, the cab rear member 12 is fixed to the vehicle body frame 5 and extends upward from the vehicle body frame 5, and supports the rear end side of the cab 2 from below via the left and right air suspensions 13 and the floating member 14. Left and right mudguard brackets 17 for supporting the left and right mudguards 11 are fixed to the upper end portions of the left and right support members 15L and 15R of the cab rear member 12.

The left and right mudguard brackets 17 each include a first bracket (upper bracket portion) 18 extending from the upper end portions of the left and right support members 15L and 15R of the cab rear member 12 to the vehicle width direction outer side, and a second bracket (vertical bracket portion) 19 extending downward from a vehicle width direction outer end portion of the first bracket 18, and are fixed to the vehicle body frame 5 via the cab rear member 12. The first brackets 18 are disposed above the vehicle body frame 5, and vehicle width direction inner end portions thereof are fixed to the upper end portions of the left and right support members 15L and 15R of the cab rear member 12. The first bracket 18 also functions as a bracket for attaching, to the vehicle body frame 5, other in-vehicle parts (in-vehicle parts other than the mudguard 11; not shown) disposed above the mudguard 11. The second bracket 19 is disposed on the vehicle width direction inner side with respect to a vehicle width direction outer end portion of the mudguard 11 and extends in the up-down direction behind the mudguard 11, and an upper end side thereof is fixed to a vehicle width direction outer end portion of the first bracket 18. A front surface side of the second bracket 19 is formed in a shape along a rear surface of the mudguard 11 and is fixed to the mudguard 11. That is, the mudguard 11 is disposed forward of the mudguard bracket 17 and supported by the mudguard bracket 17. A lower end portion of the second bracket 19 is disposed at a position having a height substantially same as a lower surface of the side member 7 of the vehicle body frame 5.

The BSM radar 10 is a detector (for example, a millimeter wave radar) that detects information (external information) on an object (another vehicle or the like) around the vehicle 1, is disposed on the vehicle width direction outer end portion behind the mudguard 11, and is fixed to the mudguard bracket 17 via the radar bracket 20. The BSM radar 10 is disposed rearward away from the rear surface of the mudguard 11. The radar bracket 20 is disposed on a vehicle width direction outer side of the second bracket 19 of the mudguard bracket 17 and extends substantially horizontally in the vehicle width direction. A vehicle width direction inner end portion of the radar bracket 20 is fixed to the second bracket 19 of the mudguard bracket 17. The BSM radar 10 is fixed to a vehicle width direction outer end portion of the radar bracket 20. That is, the BSM radar 10 is attached to the vehicle body frame 5 via the radar bracket 20, the mudguard bracket 17, and the cab rear member 12.

In the above configuration, since the BSM radar 10 is fixed to the mudguard bracket 17, when the mudguard 11 vibrates due to vibration of the vehicle 1, the BSM radar 10 vibrates integrally with the mudguard 11. In this way, when the mudguard 11 vibrates, the mudguard 11 and the BSM radar 10 vibrate integrally. Therefore, the interference between the mudguard 11 and the BSM radar 10 can be prevented, and the BSM radar 10 can be prevented from being damaged due to the interference with the mudguard 11 even when the BSM radar 10 is disposed near the rear of the mudguard 11.

In addition, the BSM radar 10 is attached to the vehicle body frame 5 via the radar bracket 20, the mudguard bracket 17, and the cab rear member 12. In this way, in the vehicle 1 including the cab rear member 12, the BSM radar 10 can be attached to the vehicle body frame 5 by using the cab rear member 12, and the BSM radar 10 can be prevented from being damaged due to the interference with the mudguard 11.

In the present embodiment, the first bracket 18 of the mudguard bracket 17 also functions as a bracket for attaching, to the vehicle body frame 5, other in-vehicle parts (in-vehicle parts other than the mudguard 11) disposed above the mudguard 11, but the present disclosure is not limited to this. The first bracket 18 does not have to function as a bracket for attaching other in-vehicle parts to the vehicle body frame 5.

In addition, in the present embodiment, the BSM radar 10 is fixed to the mudguard bracket 17 via the radar bracket 20, but the present disclosure is not limited to this. The BSM radar 10 may be fixed directly to the mudguard bracket 17. For example, the second bracket 19 of the mudguard bracket 17 may be disposed on a vehicle width direction outer end portion of the vehicle 1, and the BSM radar 10 may be directly fixed to the second bracket 19 of the mudguard bracket 17.

In addition, in the present embodiment, the mudguard bracket 17 is fixed to the vehicle body frame 5 via the cab rear member 12, but the present disclosure is not limited to this. The mudguard bracket 17 may be fixed directly to the vehicle body frame 5, or may be fixed to the vehicle body frame 5 via a part other than the cab rear member 12.

In addition, in the present embodiment, the cab rear member 12 includes the pair of, i.e., left and right support members 15L and 15R and the cab mount bracket 16, but the present disclosure is not limited thereto. Other configurations may be used as long as the cab rear member 12 extends upward from the vehicle body frame 5 and supports the lower portion of the rear end of the cab 2 from below. For example, the cab rear member 12 may be a cab rear member that is integrally formed into a substantially U shape by bending a long member.

Figure 5:
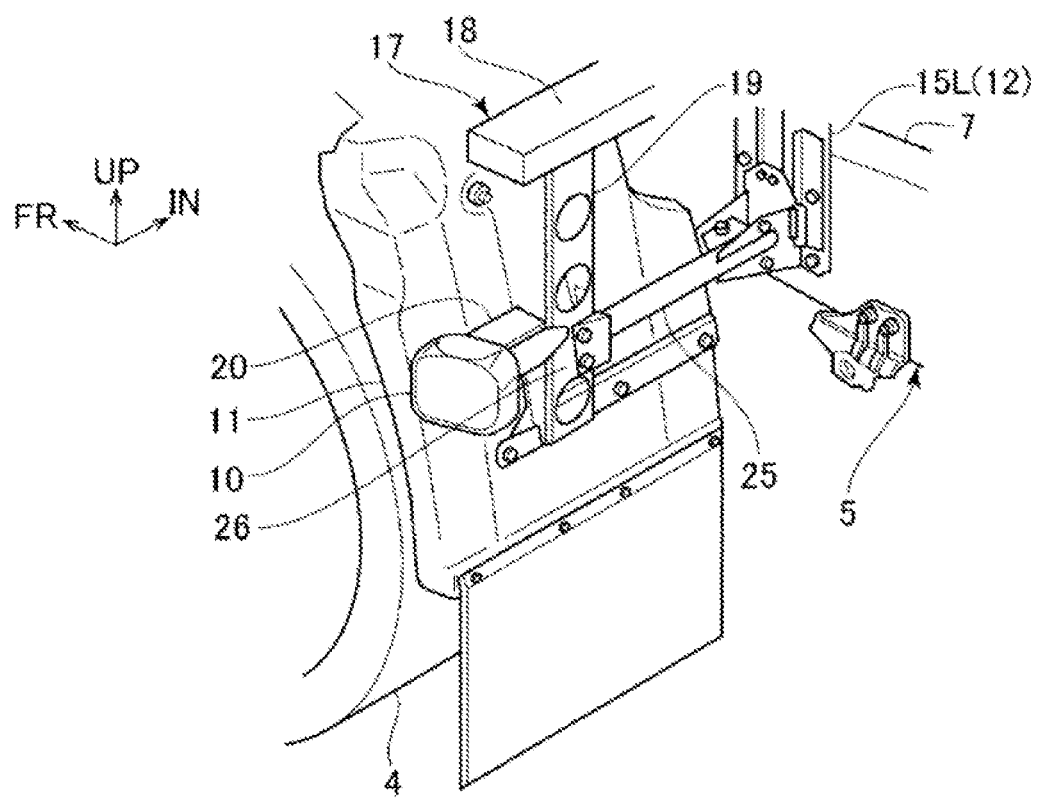
FIG. 5 is a perspective view showing a modification of the first embodiment.
Figure 6:
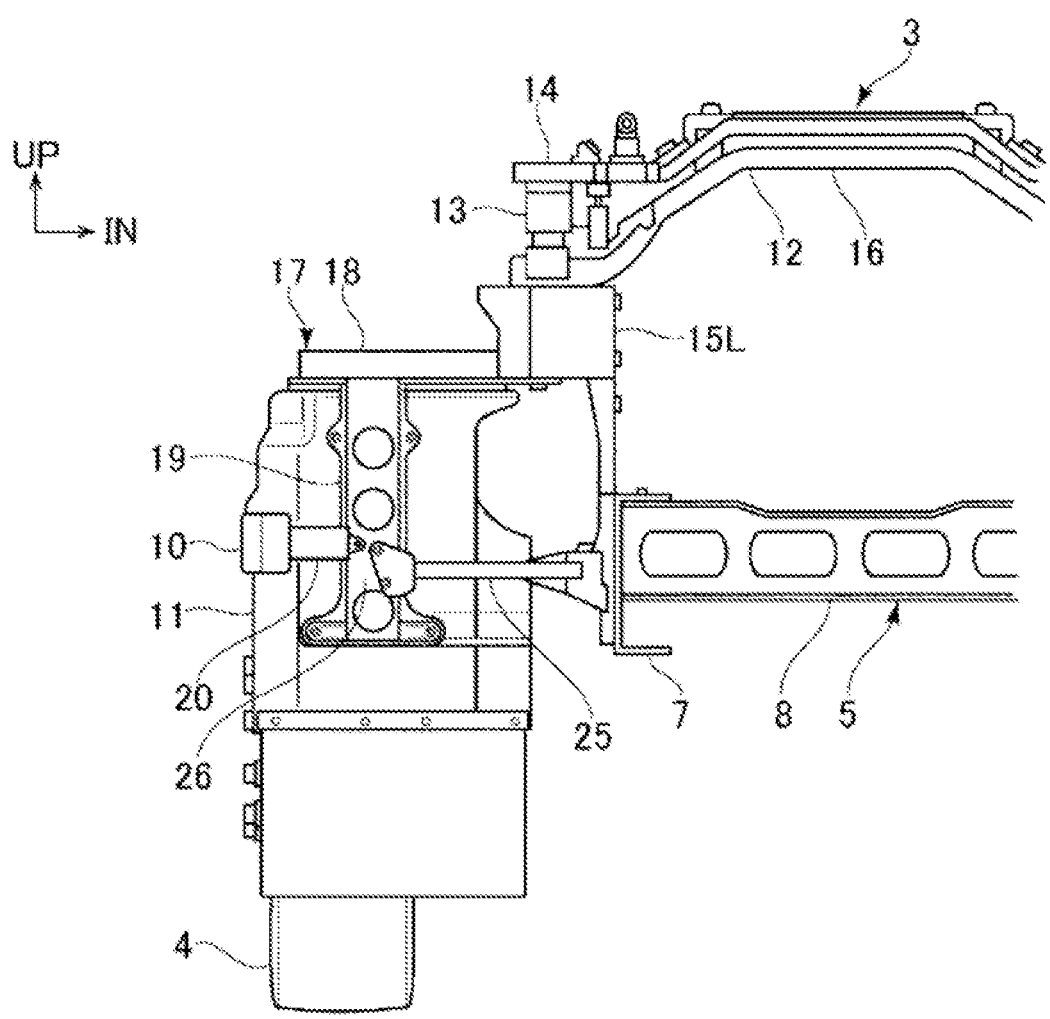
FIG. 6 is a rear view of FIG. 5.

Further, in the present embodiment, the mudguard brackets 17 each include the first bracket (upper bracket portion) 18 extending from the upper end portions of the left and right support members 15L and 15R of the cab rear member 12 to the vehicle width direction outer side, and the second bracket (vertical bracket portion) 19 extending downward from the vehicle width direction outer end portion of the first bracket 18, but the present disclosure is not limited thereto. For example, as shown in FIG. 5 and FIG. 6, in addition to the first bracket 18 and the second bracket 19 of the mudguard bracket 17, the mudguard bracket 17 may be provided with a third bracket (lower bracket portion) 25 extending in the vehicle width direction between the lower end portion of the second bracket 19 and the side member 7 of the vehicle body frame 5. A vehicle width direction inner end portion of the third bracket 25 is fixed to the vehicle body frame 5, and a vehicle width direction outer end portion of the third bracket 25 is fixed to a region 26 of the second bracket 19 below the radar bracket 20. In this configuration, in the second bracket 19 of the mudguard bracket 17 that supports the BSM radar 10, the upper end side thereof is supported on a vehicle body frame 5 side via the first bracket 18, and the lower end side thereof is supported on the vehicle body frame 5 side via the third bracket 25. In this way, the upper and lower ends of the second bracket 19 of the mudguard bracket 17 are supported on the vehicle body frame 5 side, so that the vibration of the second bracket 19 of the mudguard bracket 17 can be prevented and the vibration of the BSM radar 10 can be prevented when the vehicle 1 vibrates.

Next, a second embodiment of the present disclosure will be described with reference to the drawings. In the present embodiment, shapes of a mudguard bracket 31 and a radar bracket 32 are different from those in the first embodiment. The same reference numerals are given to the same configurations as those of the first embodiment, and the description thereof will be omitted.

Figure 7:
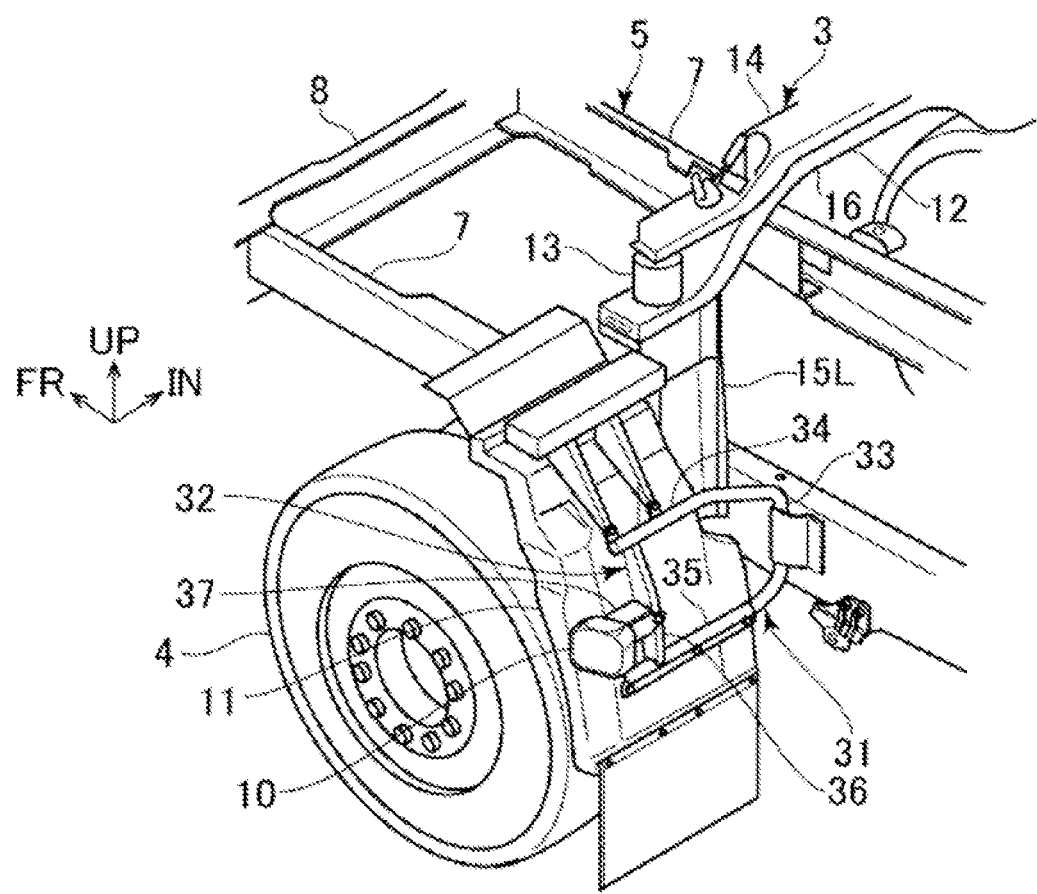
FIG. 7 is a perspective view of a main part of a vehicle to which a detector attachment structure according to a second embodiment of the present disclosure is applied.
Figure 8:
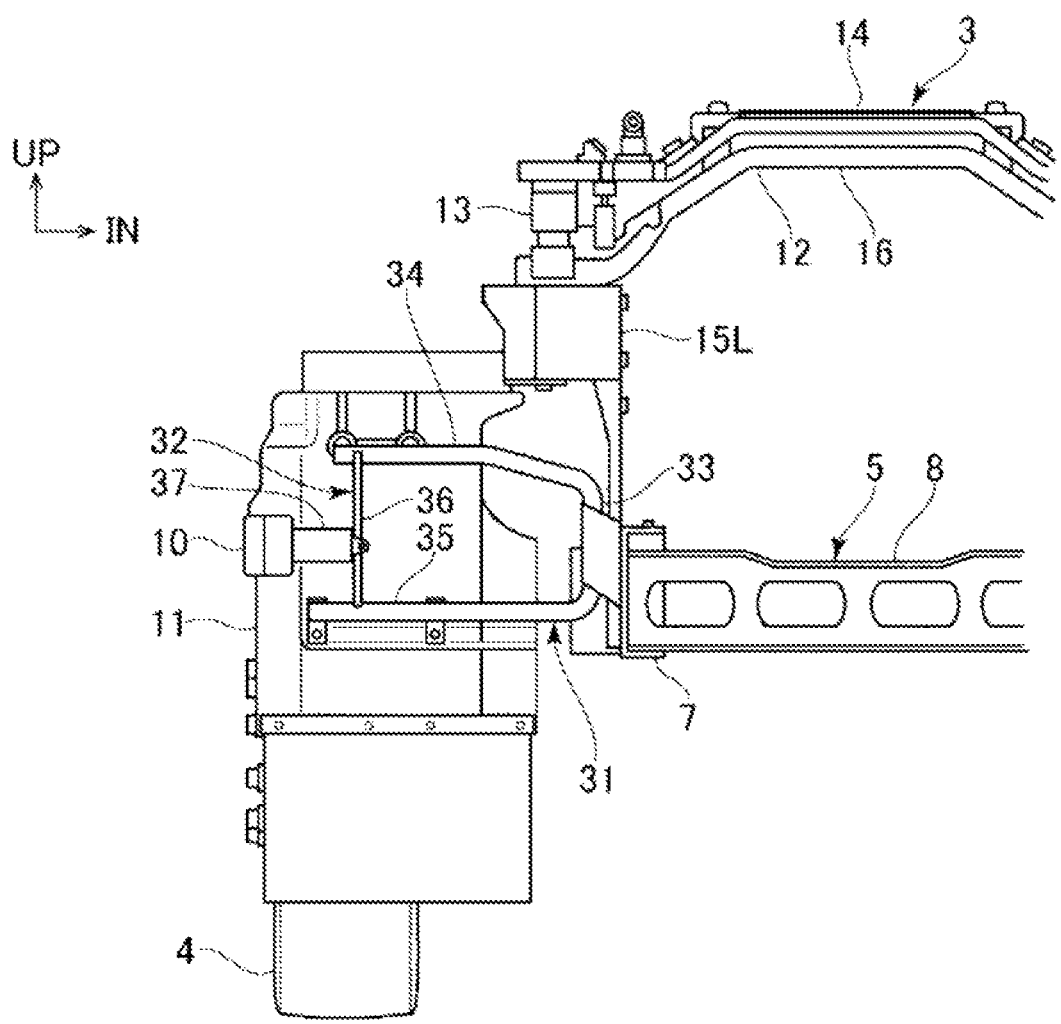
FIG. 8 is a rear view of FIG. 7.

As shown in FIG. 7 and FIG. 8, the mudguard bracket 31 is formed in a substantially U shape that is open to the vehicle width direction outer side, is disposed in the vehicle width direction outer side of the side member 7 of the vehicle body frame 5, and is fixed to the side member 7. The mudguard bracket 31 integrally includes a frame fixing portion 33 extending in the up-down direction along a vehicle width direction outer surface of the side member 7 and fixed to the side member 7, an upper mudguard fixing portion 34 extending from an upper end of the frame fixing portion 33 to the vehicle width direction outer side and fixed to the rear surface of the mudguard 11, and a lower mudguard fixing portion 35 extending from a lower end of the frame fixing portion 33 to the vehicle width direction outer side and fixed to the rear surface of the mudguard 11. The lower end of the frame fixing portion 33 is disposed at a position having a height substantially as the side member 7 of the vehicle body frame 5 (height position between an upper surface and the lower surface of the side member 7). The upper end of the frame fixing portion 33 is disposed above the vehicle body frame 5. The upper mudguard fixing portion 34 and the lower mudguard fixing portion 35 extend in the vehicle width direction along the rear surface of the mudguard 11 and are fixed to the mudguard 11. Vehicle width direction outer end portions of the upper mudguard fixing portion 34 and the lower mudguard fixing portion 35 are disposed on the vehicle width direction inner side with respect to the vehicle width direction outer end portion of the mudguard 11.

The radar bracket 32 is formed in a substantially T shape including a first radar bracket (detector bracket) 36 extending in the up-down direction and a second radar bracket 37 extending substantially horizontally from an intermediate portion of the first radar bracket 36 in the up-down direction to the vehicle width direction outer side, and is disposed on a vehicle width direction inner side with respect to the vehicle width direction outer end portion of the mudguard 11. The first radar bracket 36 is disposed away from the frame fixing portion 33 of the mudguard bracket 31 to the vehicle width direction outer side, is disposed between the upper mudguard fixing portion 34 and the lower mudguard fixing portion 35, and extends in the up-down direction. An upper end portion of the first radar bracket 36 is fixed to the upper mudguard fixing portion 34, and a lower end portion of the first radar bracket 36 is fixed to the lower mudguard fixing portion 35. The BSM radar 10 is fixed to a vehicle width direction outer end portion of the second radar bracket 37. That is, the BSM radar 10 is fixed to the mudguard bracket 31 via the radar bracket 32. Accordingly, the BSM radar 10 is attached to the vehicle body frame 5 via the radar bracket 32 and the mudguard bracket 31. The first radar bracket 36 may be fixed to the rear surface of the mudguard 11.

In the above configuration, since the BSM radar 10 is fixed to the mudguard bracket 31, when the mudguard 11 vibrates due to vibration of the vehicle 1, the BSM radar 10 vibrates integrally with the mudguard 11. In this way, when the mudguard 11 vibrates, the mudguard 11 and the BSM radar 10 vibrate integrally. Therefore, the interference between the mudguard 11 and the BSM radar 10 can be prevented, and the BSM radar 10 can be prevented from being damaged due to the interference with the mudguard 11 even when the BSM radar 10 is disposed near the rear of the mudguard 11.

In addition, since the first radar bracket 36 of the radar bracket 32 is fixed to the upper mudguard fixing portion 34 and the lower mudguard fixing portion 35 of the mudguard bracket 31, even when the mudguard bracket 31 is formed in a substantially U shape, the BSM radar 10 can be fixed to the mudguard bracket 31 via the radar bracket 32, and damage to the BSM radar 10 due to the interference with the mudguard 11 can be prevented.

Further, since the upper and lower end portions of the first radar bracket 36 of the radar bracket 32 are fixed to the upper mudguard fixing portion 34 and the lower mudguard fixing portion 35 of the mudguard bracket 31, the elastic vibration of the first radar bracket 36 can be prevented and the vibration of the BSM radar 10 can be prevented when the vehicle 1 vibrates.

In the present embodiment, the radar bracket 32 is formed in a substantially T shape including the first radar bracket (detector bracket) 36 extending in the up-down direction and the second radar bracket 37 extending substantially horizontally from the intermediate portion of the first radar bracket 36 in the up-down direction to the vehicle width direction outer side, but the present disclosure is not limited to this. It is sufficient that at least the first radar bracket (detector bracket) 36 is included. For example, the radar bracket 32 may include only the first radar bracket 36, and the BSM radar 10 may be directly fixed to the radar bracket 32 (first radar bracket 36).

Although the present disclosure has been described based on the above embodiments, the present disclosure is not limited to the contents of the above embodiments, and can be appropriately changed without departing from the present invention. That is, other embodiments, examples, operation techniques or the like made by those skilled in the art based on this embodiment are all included in the scope of the present invention.

For example, in the above first embodiment and the above second embodiment, the detector attachment structure for a vehicle according to the present disclosure is applied to the attachment structure of the detector (BSM radar 10) disposed behind the mudguard 11 for the front wheel 4 of the vehicle 1, but the present disclosure is not limited to this. The detector attachment structure may be applied to a detector attachment structure disposed behind a mudguard (not shown) for a rear wheel 9 (see FIG. 1) of the vehicle 1.

In addition, in the above first embodiment and the above second embodiment, the detector attachment structure for a vehicle according to the present disclosure is applied to the attachment structure of the BSM radar 10 (for example, a millimeter wave radar) of the vehicle 1 equipped with the BSM system, but the present disclosure is not limited to this. The detector attachment structure can be applied to an attachment structure of various detectors (for example, a camera) that detect external information of the vehicle.

The present application is based on Japanese Patent Application (Patent Application No. 2020-033771) filed on Feb. 28, 2020, and contents thereof are incorporated herein as reference.

INDUSTRIAL APPLICABILITY

The detector attachment structure for a vehicle according to the present disclosure can be widely applied to a detector attachment structure with respect to a vehicle body frame.

LIST OF REFERENCE NUMERALS 1 vehicle
2 cab
5 vehicle body frame
10 blind spot monitoring radar (detector)
11 mudguard
12 cab rear member
17, 31 mudguard bracket
18 first bracket (upper bracket portion)
19 second bracket (vertical bracket portion)
25 third bracket (lower bracket portion)
33 frame fixing portion
34 upper mudguard fixing portion
35 lower mudguard fixing portion
36 first radar bracket (detector bracket)

The invention claimed is:

1. A detector attachment structure for a vehicle, the detector attachment structure comprising:
 a mudguard bracket disposed on a vehicle width direction outer side of a vehicle body frame and fixed to the vehicle body frame;
 a mudguard disposed forward of the mudguard bracket and supported by the mudguard bracket;
 a detector disposed on a vehicle width direction outer end portion behind the mudguard and fixed to the mudguard bracket to detect external information of the vehicle; and
 a detector bracket fixed to the mudguard bracket,
 wherein the detector is fixed to the mudguard bracket via the detector bracket by being fixed to the detector bracket.

2. The detector attachment structure for the vehicle according to claim 1, further comprising:
 a cab disposed above the vehicle body frame; and
 a cab rear member fixed to the vehicle body frame, extending upward from the vehicle body frame, and supporting a rear end side of the cab from below,
 wherein the mudguard bracket includes an upper bracket portion disposed above the vehicle body frame and extending from the cab rear member to the vehicle width direction outer side, and a vertical bracket portion extending downward from the upper bracket portion, disposed behind the mudguard, and fixed to the mudguard, and the mudguard bracket is fixed to the vehicle body frame via the cab rear member, and
 the detector is fixed to the vertical bracket portion of the mudguard bracket.

3. The detector attachment structure for the vehicle according to claim 2,
 wherein the mudguard bracket includes a lower bracket portion extending from a lower end side of the vertical bracket portion to a vehicle width direction inner side and fixed to the vehicle body frame.

4. The detector attachment structure for the vehicle according to claim 1,
 wherein the mudguard bracket includes a frame fixing portion extending in an up-down direction and fixed to the vehicle body frame, an upper mudguard fixing portion extending from an upper end side of the frame fixing portion to the vehicle width direction outer side and fixed to the mudguard, and a lower mudguard fixing portion extending from a lower end side of the frame fixing portion to the vehicle width direction outer side and fixed to the mudguard, and the mudguard bracket is formed in a substantially U shape, and
 wherein the detector bracket is disposed on the vehicle width direction outer side with respect to the frame fixing portion of the mudguard bracket and between the upper mudguard fixing portion and the lower mudguard fixing portion, and extends in the up-down direction, and upper and lower end portions of the detector bracket are fixed to the upper mudguard fixing portion and the lower mudguard fixing portion.

5. The detector attachment structure for the vehicle according to claim 1, wherein the mudguard is disposed behind a front wheel of the vehicle, and
 wherein the detector is located between the mudguard and a device disposed behind the mudguard in a front-rear direction of the vehicle, and is disposed on a vehicle width direction outer end portion behind the mudguard.

6. The detector attachment structure for the vehicle according to claim 1, wherein the detector is a radar that detects the external information related to an object around the vehicle.

7. The detector attachment structure for the vehicle according to claim 1, wherein the detector bracket is disposed on the mudguard bracket and extends horizontally in the vehicle width direction, and
 wherein the detector is fixed to a vehicle width direction outer end portion of the detector bracket.

8. The detector attachment structure for the vehicle according to claim 1, wherein a battery box is disposed behind the mudguard.

9. The detector attachment structure for the vehicle according to claim 1, further comprising:
 a cab disposed above the vehicle body frame; and
 a cab rear member fixed to the vehicle body frame, extending upward from the vehicle body frame, and supporting a rear end side of the cab from below,
 wherein the mudguard bracket is fixed to the vehicle body frame via the cab rear member.

10. The detector attachment structure for the vehicle according to claim 1, wherein the mudguard bracket is formed in a U shape, and
 wherein the detector bracket extends in an up-down direction, and upper and lower end portions of the detector bracket are fixed to the mudguard bracket.

* * * * *